United States Patent
Lai (10) Patent No.: US 6,633,472 B2
(45) Date of Patent: Oct. 14, 2003

(54) ELECTRIC OUTLET REMOTE CONTROL AND POWER PROTECTION CIRCUIT

(76) Inventor: Jung-Hua Lai, 1/F., No. 14, Lane 45, Teho Rd., Yungho City, Taipei County, Taiwan (TW)

( * ) Notice: Subject to any disclaimer, the term of this patent is extended or adjusted under 35 U.S.C. 154(b) by 165 days.

(21) Appl. No.: 09/948,614

(22) Filed: Sep. 10, 2001

(65) Prior Publication Data

US 2003/0048587 A1 Mar. 13, 2003

(51) Int. Cl.[7] .................................................. H02H 1/00
(52) U.S. Cl. ........................ 361/93.1; 361/42; 361/45; 361/115
(58) Field of Search .............................. 361/93.1, 115, 361/42, 62, 64, 66, 45, 100

(56) References Cited

U.S. PATENT DOCUMENTS

| | | | | |
|---|---|---|---|---|
| 4,853,823 A | * | 8/1989 | Arechavaleta et al. ...... | 361/100 |
| 4,977,515 A | * | 12/1990 | Rudden et al. ............. | 700/296 |
| 5,910,784 A | * | 6/1999 | Lai ............................. | 341/176 |
| 6,211,581 B1 | * | 4/2001 | Farrant ........................ | 307/117 |

* cited by examiner

Primary Examiner—Stephen W. Jackson
(74) Attorney, Agent, or Firm—Rosenberg, Klein & Lee (57) ABSTRACT

A remote control and power protection circuit installed in an electric outlet and adapted to control the operation of each electric socket of the electric outlet by means of a remote controller and to automatically trip off the circuit upon an overcurrent or overvoltage. The remote control and power protection circuit includes a CPU having voltage/current detector and amplifier circuit means and voltage/current judging circuit means adapted to detect the voltage/current value of inputted power supply, and to drive a red LCD to flash and a buzzer to buzz when inputted current value approaches the rated value, and to drive an overload switch element to trip off power supply upon an overcurrent or overvoltage.

9 Claims, 7 Drawing Sheets

ELECTRIC OUTLET REMOTE CONTROL AND POWER PROTECTION CIRCUIT

BACKGROUND OF THE INVENTION

The present invention relates to electric outlets, and more particularly, to an electric outlet remote control and power protection circuit.

Regular home or office electric apparatus may be directly connected to the electric sockets of wall outlets or through electric extension cables. For a safety use of an electric apparatus, fuseless circuit breaker means may be installed. However, the fuseless circuit breaker may do no work upon an overcurrent if the cable to the load does not match the specification of the fuseless current breaker. Any minor specification error between the fuseless circuit breaker and the electric cable may cause a short circuit upon an overload before breaking of the circuit breaker. Because regular electric wall outlets do not have voltage and current indications, the user may misuse an electric wall outlet, causing a catastrophe.

Further, regular electric apparatus commonly have the remote control function. For controlling different electric apparatus, different remote controllers shall be used. It is inconvenient to control a number of electric apparatus with a number of remote controllers.

SUMMARY OF THE INVENTION

The present invention has been accomplished under the circumstances in view. It is one object of the present invention to provide a remote control and power protection circuit, which enables the user to selectively control on/off status of the electric sockets of an electric outlet. It is another object of the present invention to provide a remote control and power protection circuit, which automatically cuts off power supply from the electric outlet under control upon an overload. The remote control and power protection circuit is installed in an electric outlet, and adapted to control the operation of each electric socket of the electric outlet by means of a remote controller and to automatically trip off the circuit upon an overcurrent or overvoltage. The remote control and power protection circuit includes a CPU having voltage/current detector and amplifier circuit means and voltage/current judging circuit means adapted to detect the voltage/current value of inputted power supply, and to drive a red LCD to flash and a buzzer to buzz when inputted current value approaches the rated value, and to drive an overload switch element to trip off power supply upon an overcurrent or overvoltage. The invention achieves the following advantages:

1. It detects and displays voltage value and the value of current in consumption, and gives a signal upon an overload.
2. It displays power consumption and also detects the circuit status of the electric outlet without load, and gives a signal upon an electric leakage.
3. It automatically trips off the circuit upon an overload or short-circuit.
4. It enables the user to selectively turn on/off the electric sockets of the electric outlet by means of a remote controller, preventing unnecessary power loss.
5. It enables the electric sockets of the electric outlet to be selectively turned on/off at the respective set time.
6. It enables the electric sockets of the electric outlet to be selectively switched off when receiving no load.
7. It enables the user to use one single remote controller to control two or more electric outlets.

DETAILED DESCRIPTION OF THE PREFERRED EMBODIMENT

Referring to FIGS. 1, 2, 6, and 7, a remote control and power protection circuit is installed in an electric wall outlet or extension cable and controlled by a commercially available remote controller to control the operation of the electric sockets 4 of the electric wall outlet or the electric sockets 61 of the electric outlet 6 of the electric extension cable. The remote control and power protection circuit comprises a CPU 5 having a data memory 512 adapted to store the module codes of the electric sockets 4 or 61, and an output control 3 for output of control signal to control the operation of the electric sockets 4 or 61. Because every electric socket 4 or 61 has a respective module code, the user can operate the remote controller to selectively turn one/off the electric sockets 4 or 61. For example, the user can operate the remote controller to turn on the first, the third and the fifth sockets, leaving the second, the fourth and the sixth sockets turned off. The CPU 5 comprises a sequential operation/coding encoding memory unit 51. LED indicator lights 17 are respectively connected to the electric sockets 4 or 61. When one electric socket 4 is electrically connected, the respective LED indicator light 17 is off. On the contrary, when one electric socket 4 is electrically disconnected, the respective LED indicator light 17 is on. Matrix buttons 2 are provided for input of binary codes 00~65, total 66 sets of codes. Inputted codes are stored in the data memory 512.

In case two or more electric outlets are used, the remote control and power protection circuit will reset the R-LED and then enter the stand-by mode after connection of the power module to power supply. When using the remote controller, the user can operate the matrix buttons 2 to change the binary code. For example, the user can press button "1" to turn on R-LED, and then release button "1" and press button "2" to turn off R-LED, and then release button "2" and press the switching button to turn on G-LED, so as to complete the new setting. Alternatively, the user can use the remote controller to directly input the module code "12".

When using the remote controller, the remote controller is aimed at the remote control and power protection circuit in the electric wall outlet or the electric outlet of the electric extension cable. When automatically searching the code, press the set button and hold it in the depressed position. At this time, the indicator light of the remote controller is turned off for 1.5 seconds and then turned on for another 1.5 seconds. When released the set button after the indicator light of the remote controller has been turned on, the remote controller immediately enters the scanning mode to output a searching signal to the remote control and power protection circuit in the electric wall outlet or the electric outlet of the electric extension cable. Upon receipt of the signal from the remote controller, the signal is amplified by a receiving amplifier 14, and then sent to the data memory 512 of the sequential operation/coding encoding memory unit 51 for comparison with the storage data of module codes, enabling the matched module code to be fetched. If the R-LED 17 of one electric socket 4 or 61 is turned off or a beep sound is produced, it means that the frequency matches. At this time, the user can lock the signal by pressing either button of the remote controller. When locked, the signal is fetched from the data memory 512 and then sent to a LED/LCD driver 513, causing it to turn on/off the assigned electric sockets 4 or 61.

After locking, the number 1, 2, 3, 4, 5, 6 on the remote controller correspond to the respective electric sockets 4 or 61, i.e., every individual electric socket 4 or 61 corresponds to a respective number and is controlled by the output control 3 or 31.

When operating the remote controller, the output signal of the remote controller is amplified by the receiving amplifier 14, and then sent to the data memory 512 of the sequential operation/coding encoding memory unit 51 for comparison with the storage data of module codes, enabling the matched module code to be fetched and sent to the output control 3 or 31, causing the output control 3 or 31 to control G pole of Q3 or Q6 and to further electrically connect A~K. Thus, the two opposite contacts of the corresponding electric socket 4 or 61 are electrically connected. The sequential operation/coding encoding memory unit 51 further comprises a timer 511 for controlling on/off status of the assigned electric socket 4 or 61 at a predetermined time.

Normally, one terminal of AC power supply passes through one contact of the electric socket 4 or 61, the other terminal of AC power supply passes through an overload switch element 16 and the thyristor at contact A of Q4 or Q6 to the other contact of the electric socket 4 or 61.

Further, by means of the voltage detection amplifier 56, current detection amplifier 57, and voltage/current judging circuit 53 of the CPU 5, the CPU 5 monitors the safety value of voltage and current. When electric current surpasses the rated value, the CPU 5 drives the red LED 17 to flash and the buzzer 18 to buzz, and simultaneously drives the overload switch element 16 to switch off the circuit. The CPU 5 drives the overload switch element 16 to switch on the circuit a predetermined length of time after off state.

At the initial stage after connection of the power generating circuit 1 to AC power supply, the CPU 5 obtains the necessary working voltage to start the oscillation generator 13. At this time, 5V High voltage is inputted into the IN terminal of the CPU 5, causing the CPU 5 to perform reset action. When reset, the CPU 5 starts running the program from the address 0000H, and therefore the circuit enters the stand-by mode.

The functions of the remote control and power protection circuit are outlined hereinafter:

1. Voltage Indication

Figure 1:
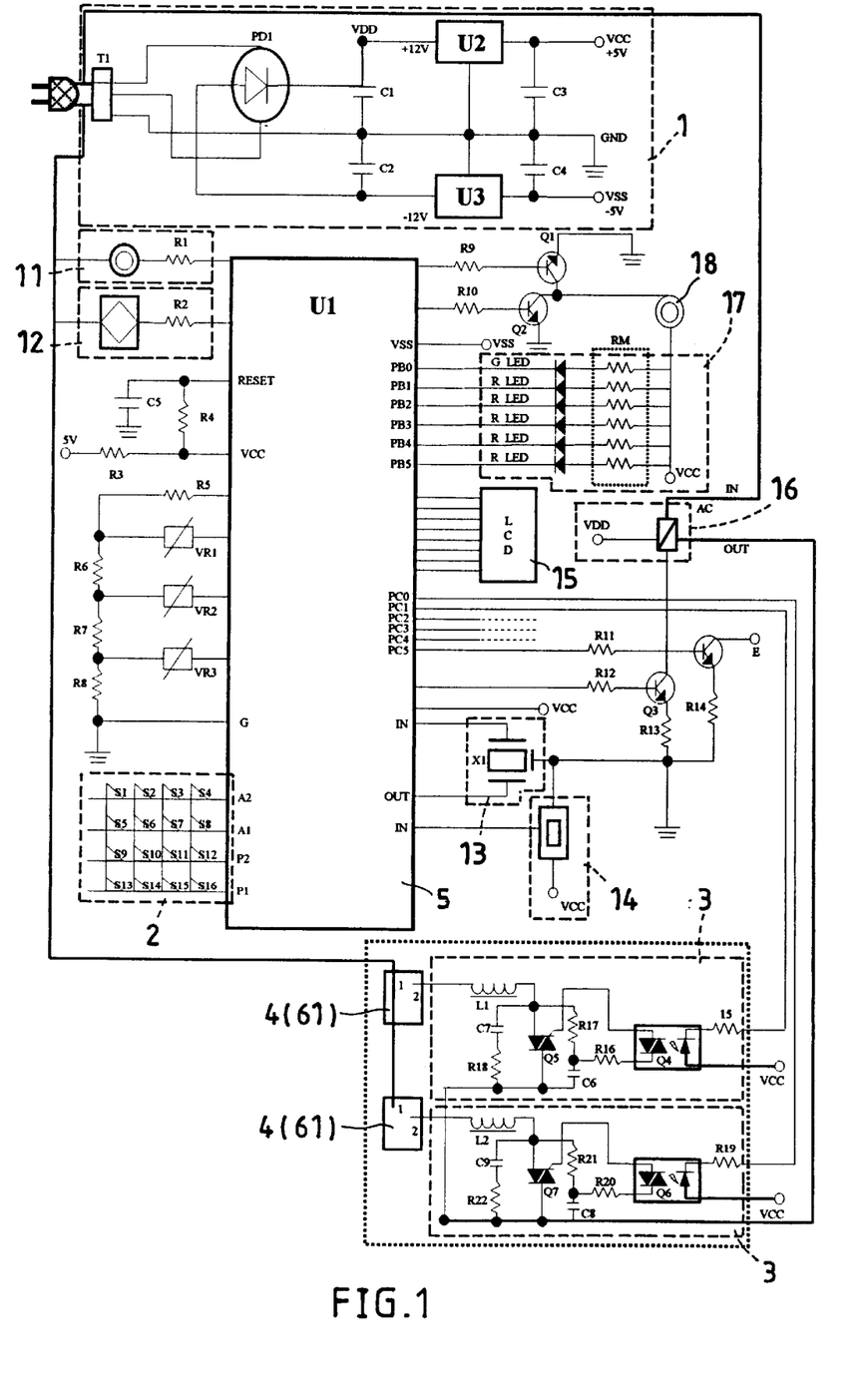
FIG. 1 is a circuit diagram of a remote control and power protection circuit according to the present invention.
Figure 2:
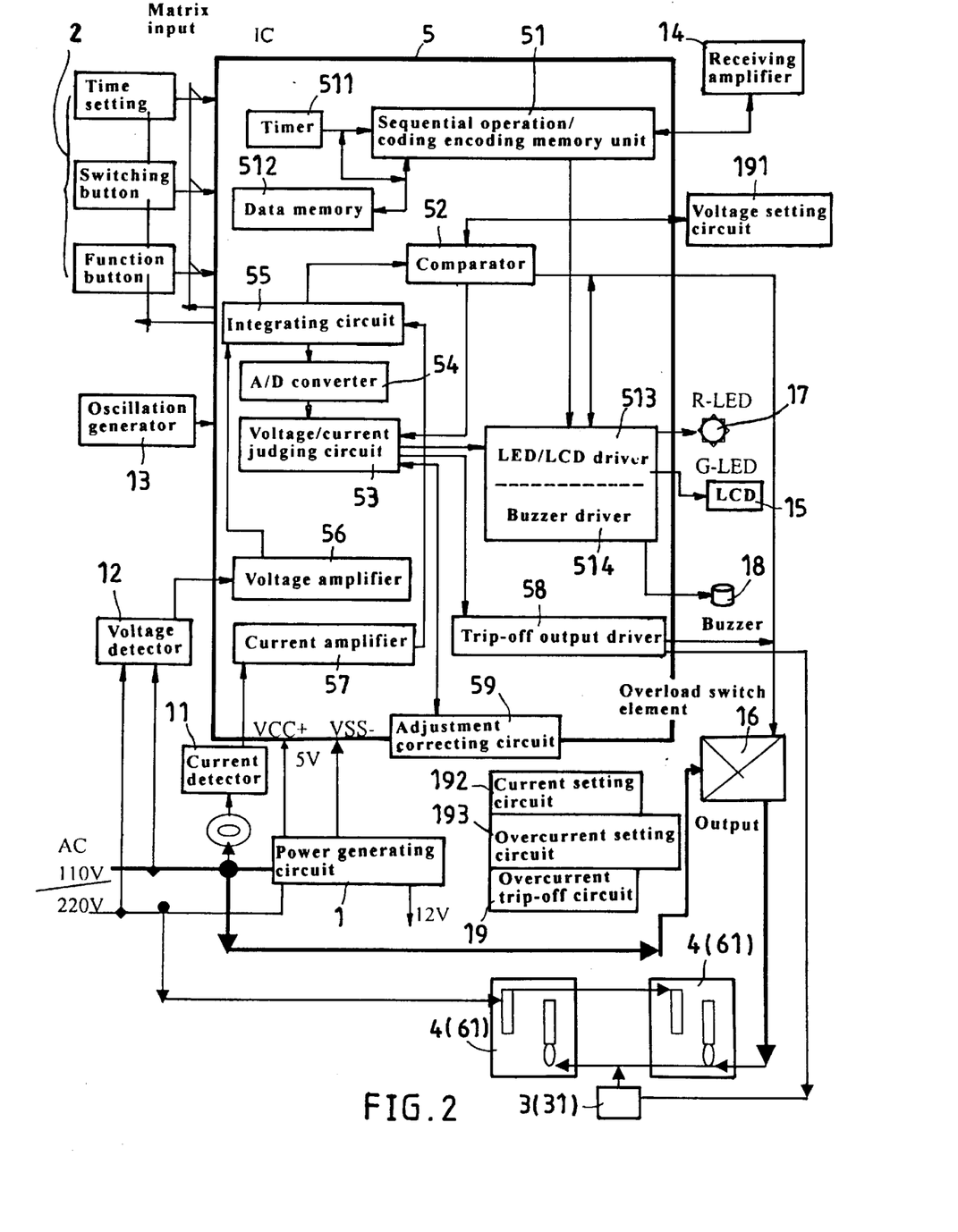
FIG. 2 is a circuit block diagram of the CPU for the remote control and power protection circuit according to the present invention.
Figure 3:
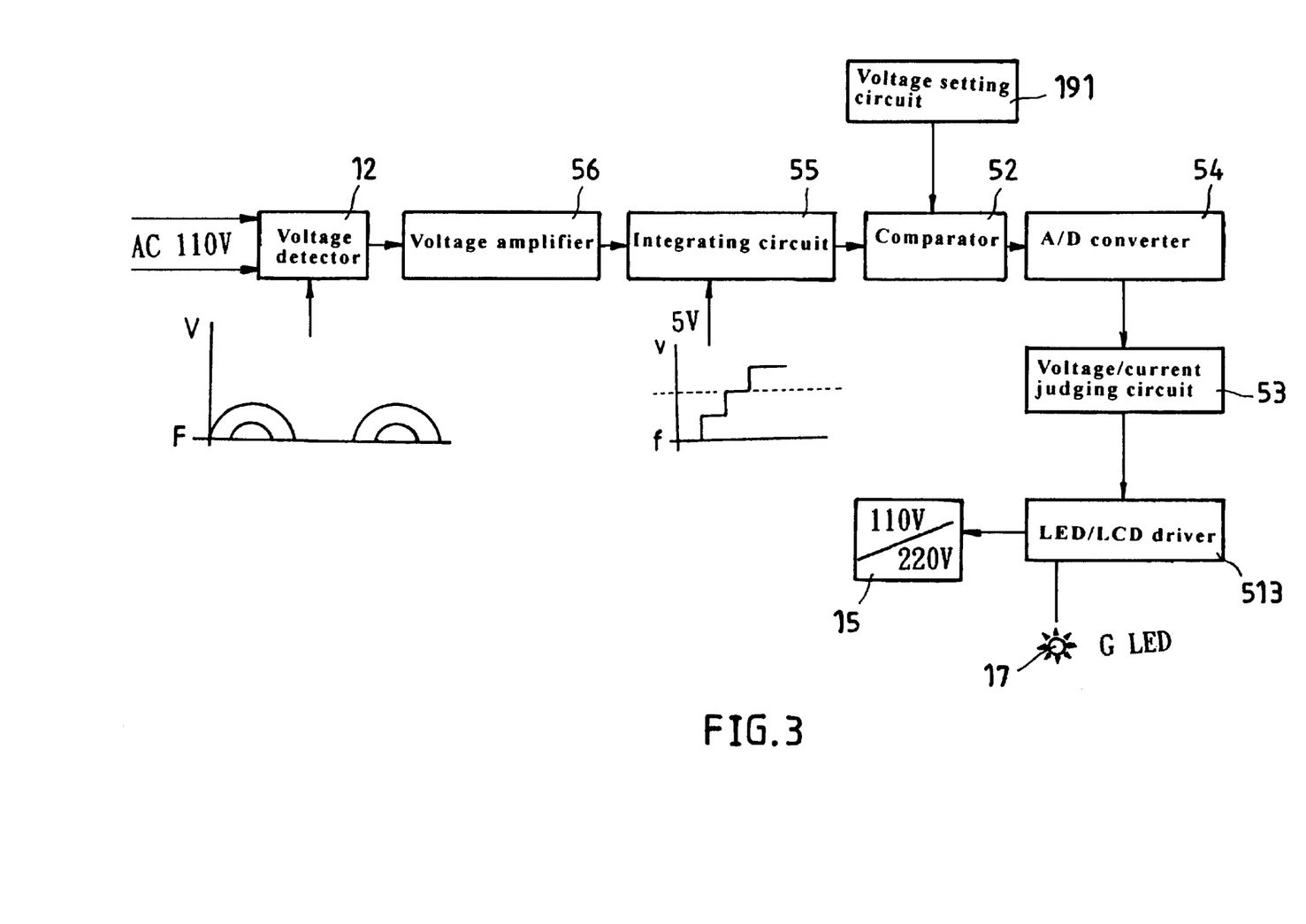
FIG. 3 is a block diagram showing the operation of the voltage detector according to the present invention.

When the socket 4 or 61 receives no load, the voltage detector 12 detects the voltage signal, enabling the detected voltage signal to be amplified by the voltage amplifier 56 and then sent through an integrating circuit 55 of the CPU 5 to a comparator 52 for comparison with a reference voltage set through a voltage setting circuit 191. If the detected voltage does not surpass the reference voltage, the voltage value is 110V. IF the detected voltage surpasses the reference voltage, the voltage value is 220V. The detected voltage is converted into digital signal by an A/D converter 54, and then judged by a voltage/current judging circuit 53. The judging result causes the LED/LCD driver 513 to turn on R-LED 17 when the detected voltage is 110V, or G-LED 17 when the detected voltage is 220V (see FIGS. 2 and 3).

2. Current Indication

Figure 4:
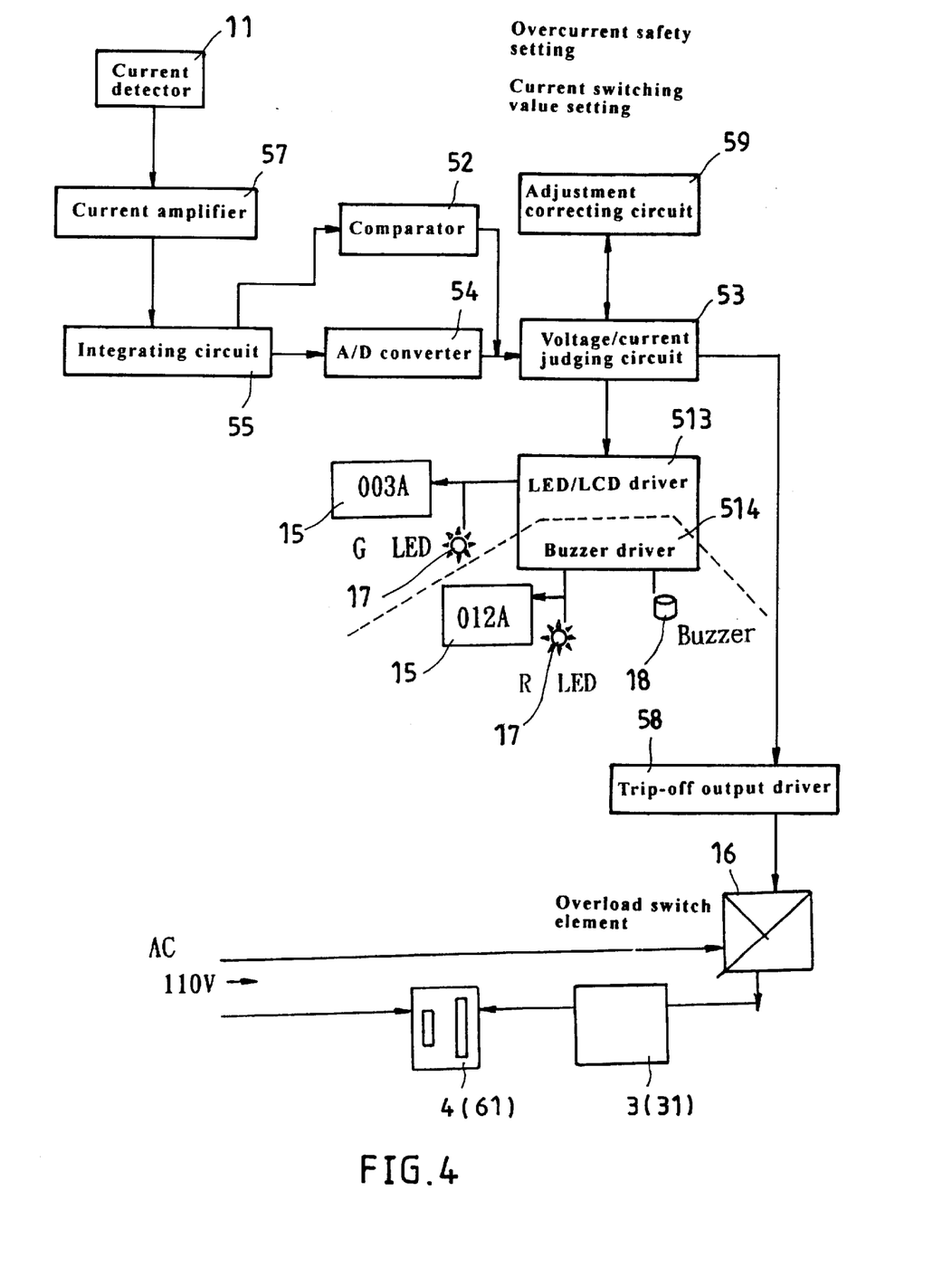
FIG. 4 is a block diagram showing the buzzer activated, the R-LED flashed according to the present invention.

When the socket 4 or 61 receives the load, the current detector 11 detects the signal, enabling the detected signal to be amplified by the current amplifier 57 and then sent through the integrating circuit 55 of the CPU 5 to the A/D converter 54 for conversion into a corresponding digital signal and simultaneously to the comparator 52 for comparison. The comparison result is judged by the voltage/current judging circuit 53. The voltage/current judging circuit 53 drives the LED/LCD driver 513 to turn on the G-LED 17, and the LCD 15 shows current amount of 001 or 003 . . . (see FIGS. 2 and 4).

3. Overcurrent L/H Safety Setting (Alarm Buzzer)

When the socket 4 or 61 receives the load, the overcurrent setting circuit 193 detects the current signal for comparison with a preset safety current value (the reference value). At this time, the integrating circuit 55 drops the integrated level below the set level due to increasing of electric current. This signal is then sent to the A/D converter 54 as well as the comparator 52. The compared signal outputted from the comparator 52 is combined with the output signal from the A/D converter 54. The combined signal is then sent to the overcurrent setting circuit 193 for judging. If the current value of the current value of the combined signal reaches 90% of the rated current value, the overcurrent setting circuit 193 drives the buzzer driver 514 to activate the buzzer 18, causing the buzzer 18 to output a first stage alarm where the buzzer 18 buzzes three times each time lasting 30 seconds (the alarm mode can be set as desired). When the current value of the combined signal reaches 90% of the rated current value, the buzzer buzzes three times at a relatively higher frequency, and the LED/LCD driver 513 drives the R-LED 17 to flash. The alarm interval is 3~5 seconds after each 30-second alarm buzzing. For example, Q4 of the output control circuit 3 (31) controls the supply of power supply to the socket 4 or 61. When the electric current at the socket 4 or 61 reaches 100% of the a rated value, the CPU 5 outputs a control signal through its PC0 pin to Q4 and Q5, causing Q4 and Q5 to switch off power supply from the socket 4 or 61 (see FIGS. 2 and 4).

4. Overcurrent Trip-off Safety Setting (Alarm Buzzer)

Figure 5:
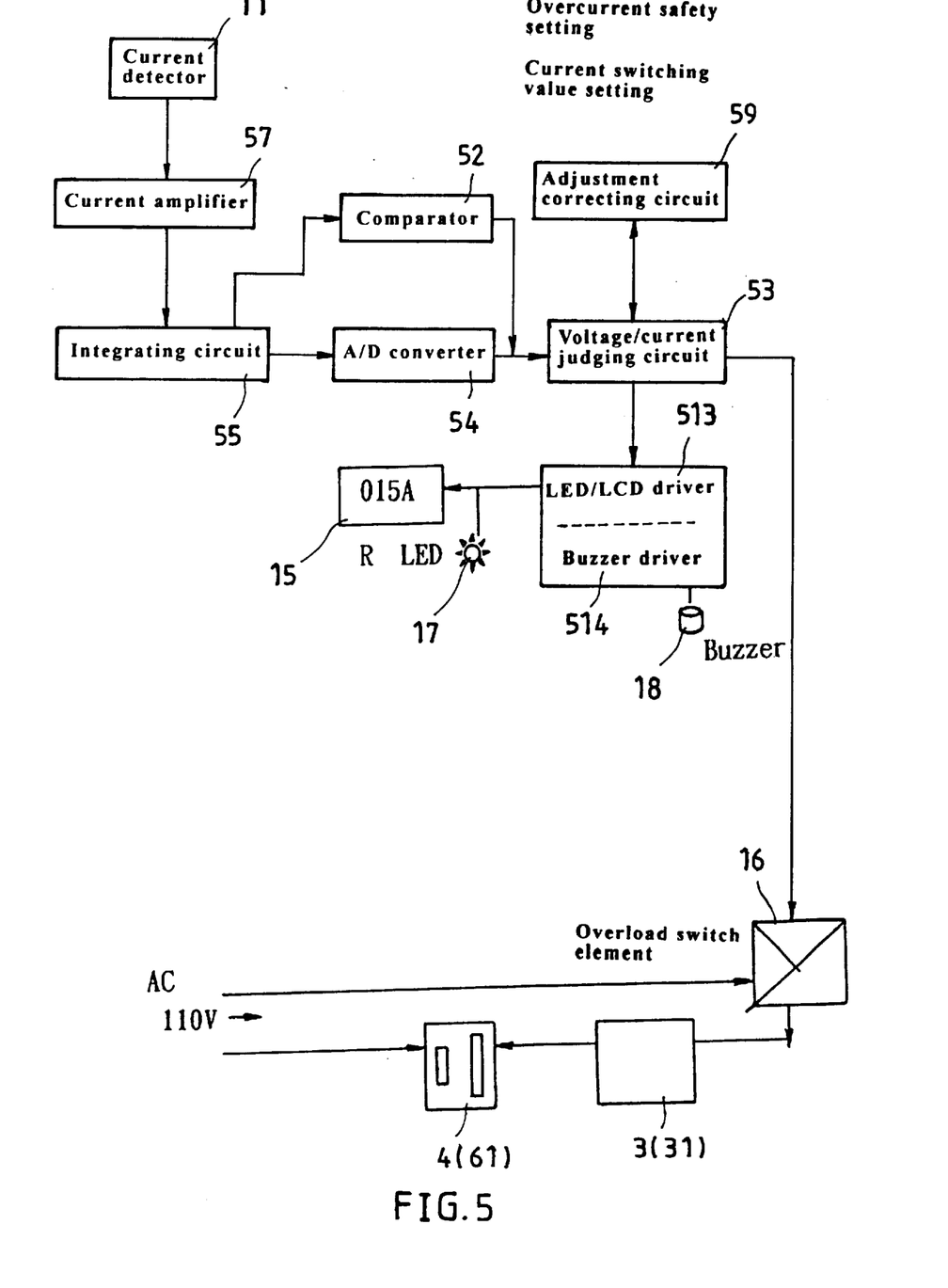
FIG. 5 is a block diagram showing an overcurrent trip-off action of the present invention.
Figure 6:
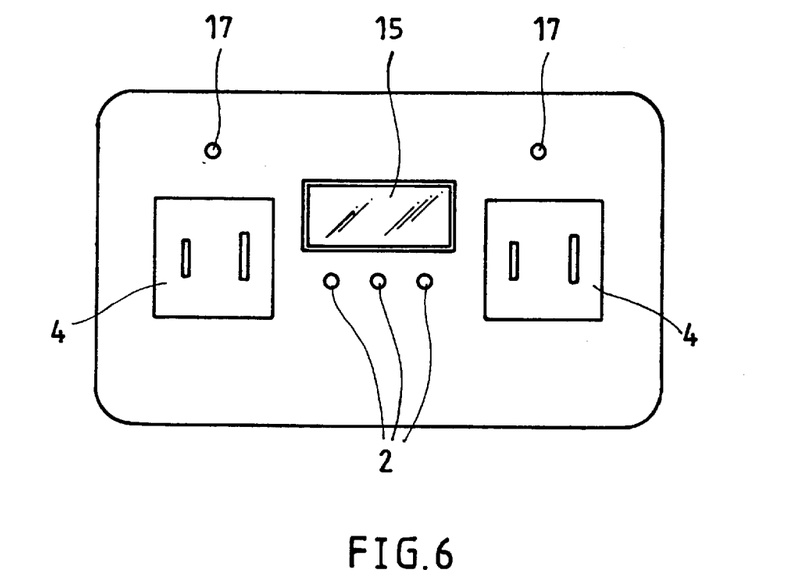
FIG. 6 is a plain view of an electric wall outlet constructed according to the present invention.
Figure 7:
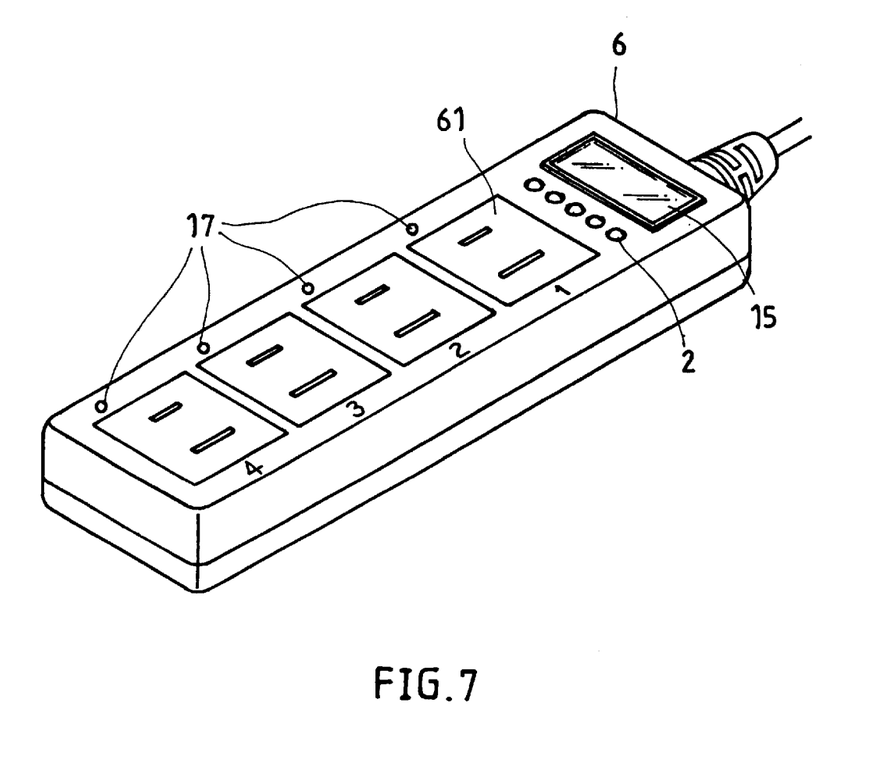
FIG.7 is an elevational view of the electric outlet of an electric extension cable constructed according to the present invention.
Figure 8:
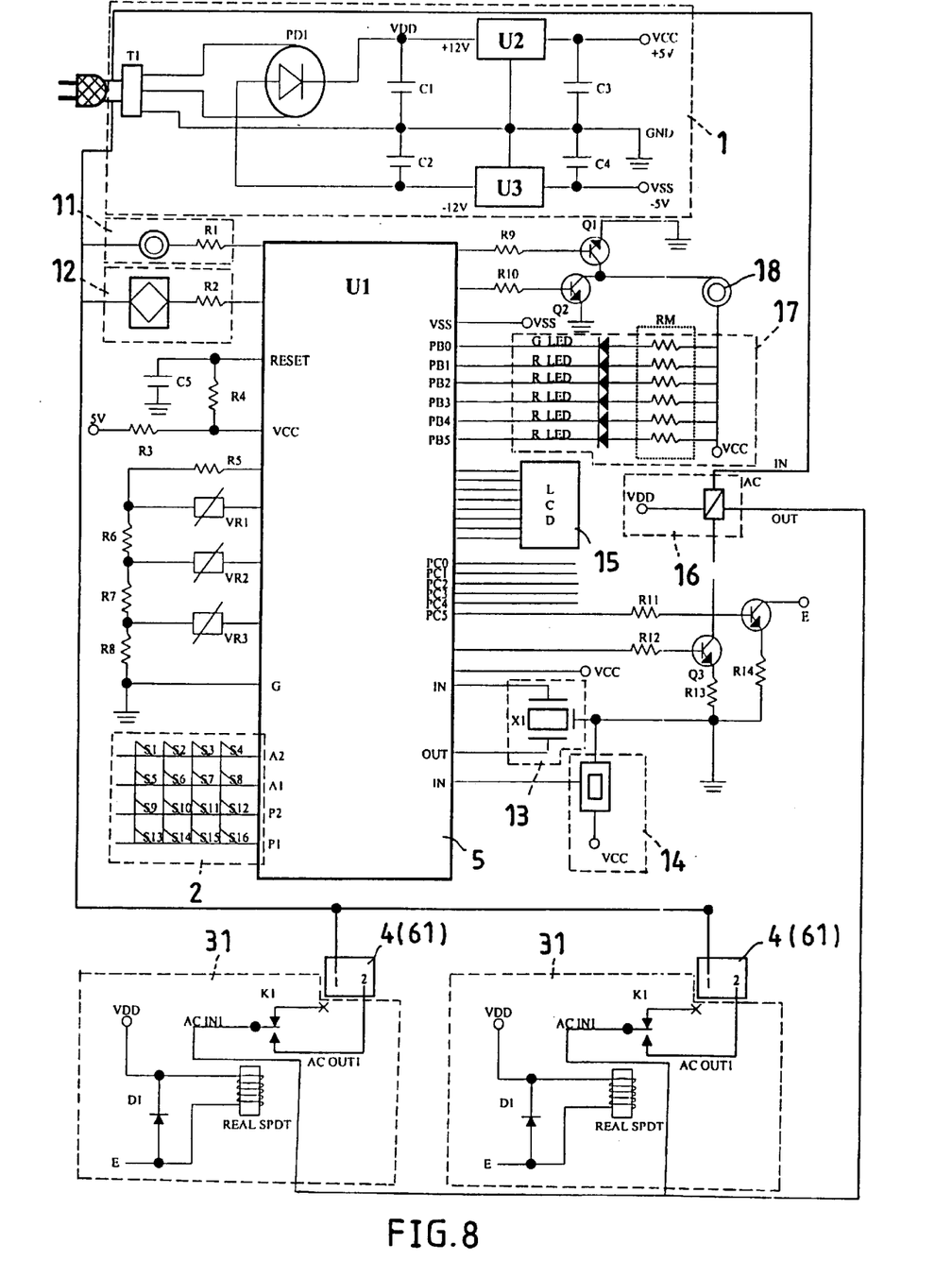
FIG. 8 is a circuit diagram of an alternate form of the present invention.

When the socket 4 or 61 receives the load, the overcurrent trip-off circuit 19 detects the signal and sends the detected signal to the voltage/current judging circuit 53 for overcurrent safety value judgment. If the current value of the detected signal surpasses 100% of the rated current value and the condition lasted over 3 minutes, the trip-off output driver 58 immediately drives the switch element 16 to switch off power supply (see FIGS. 2 and 5). If the electric apparatus of the load is short-circuited, the trip-off output driver 58 automatically drives the switch element 16 to switch off power supply.

It is to be understood that the drawings are designed for purposes of illustration only, and are not intended for use as a definition of the limits and scope of the invention disclosed.

What the invention claimed is:

1. A remote control and power protection circuit comprising:
   a current detector installed in an electric outlet and adapted to detect current value of inputted power supply at said electric outlet;
   a CPU (central processing unit), said CPU comprising a current amplifier connected to said current detector and adapted to amplify detected current signal;
   an integrating circuit connected to said current amplifier and adapted to integrate amplified current signal for comparison with a predetermined safety reference value;
   an A/D converter converts a current sent by integrating circuit between digital and analog signal;
   a current judging circuit connected to said integrating circuit and adapted to judge overcurrent status subject to the comparison with the predetermined safety reference value;
   a trip-off output driver adapted to receive output signal from said current judging circuit and to produce a trip-off control signal subject to the overcurrent status of the output signal from said current judging circuit;
   a LCD driver adapted to display the current value of the output signal from said current judging circuit; and
   an overload switch element controlled by said trip-off output driver to switch on/off power supply subject to the current value of the output signal from said current judging circuit;
   wherein said current detectors detects a signal upon loading of a load at said electric outlet, enabling the detected signal to be amplified by said current amplifier and then sent through said integrating circuit to an A/D converter for conversion into a corresponding digital signal and simultaneously to a comparator for comparison, so that said voltage/current judging circuit judges the comparison result, and drives said LCD driver to display the value of the detected signal and said overload switch element to switch off power supply when the current value of detected signal surpasses the predetermined safety reference value.

2. The remote control and power protection circuit of claim 1 further comprising:
   a power generator adapted to convert inputted power supply to a predetermined voltage value for said CPU; and
   an output control circuit, said output control circuit having one end connected through at least one socket of said electric outlet to output end of said overload switch element;
   wherein said current detectors detects a signal upon loading of a load at said electric outlet, enabling the detected signal to be amplified by said current amplifier and then sent through said integrating circuit to an A/D converter for conversion into a corresponding digital signal and simultaneously to a comparator for comparison, so that said voltage/current judging circuit judges the comparison result, and drives said LCD driver to display the value of the detected signal and said overload switch element to switch off power supply when the current value of detected signal surpasses the predetermined safety reference value.

3. The remote control and power protection circuit of claim 1 further comprising:
   a voltage detector adapted to detect input voltage value of inputted power supply; and
   a voltage amplifier installed in said CPU and adapted to amplifier the voltage signal detected by said voltage detector; and
   a voltage judging circuit connected to said voltage amplifier and adapted to judge the 110V/220V of the voltage value of the amplified voltage signal and to drive said LCD driver to turn on a green light emitting diode when the voltage value of the amplified voltage signal is 110V or a red light emitting diode when the voltage value of the amplified voltage signal is 220V;
   wherein said voltage detectors detects a signal upon loading of a load at said electric outlet, enabling the detected signal to be amplified by said voltage amplifier and then sent through said integrating circuit to an A/D converter for conversion into a corresponding digital signal and simultaneously to a comparator for comparison, so that said voltage/current judging circuit judges the comparison result, and drives said LCD driver to display the value of the detected signal and said overload switch element to switch off power supply when the voltage value of detected signal surpasses the predetermined safety reference value.

4. The remote control and power protection circuit of claim 1 further comprising:
   a buzzer adapted to buzz when the voltage or current value of the detected signal surpasses the predetermined safety reference value; and
   a buzzer driver installed in said CPU and adapted to drive said buzzer subject to the judging result of said current judging circuit and said voltage-judging circuit.

5. The remote control and power protection circuit of claim 1 further comprising:
   a plurality of light emitting diodes of different colors for current and voltage status display; and
   a LED driver controlled by said current judging circuit and said voltage judging circuit to drive said light emitting diodes to display the current and voltage status of the detected signal.

6. The remote control and power protection circuit of claim 1 further comprising a voltage setting circuit and a current setting circuit for the setting the predetermined reference current value and the predetermined reference voltage value.

7. The remote control and power protection circuit of claim 1 further comprising an overcurrent setting circuit and an overcurrent trip-off circuit for the setting of safety current value and trip-off current value respectively.

8. The remote control and power protection circuit of claim 1 wherein said CPU comprises a data memory adapted to store module code for each of said at least one socket of said electric outlet, a sequential operation/coding encoding memory unit adapted to call out module codes sequentially and to calculate module codes 1.5 seconds per each time so as to check conformity of each outputted module code with the remitted radio frequency of the remote controller being used to control the operation of the remote control and power protection circuit, a coding/encoding memory for enabling the user to change the module code of each of the at least one socket of said electric outlet through a matrix button circuit, and a timer for calculating time for on/off control of the at least one socket of said electric outlet.

9. The remote control and power protection circuit of claim 1 further comprising a matrix button circuit, said matrix button circuit comprising a time setting button for setting time, a switching button for LCD voltage/current display switching and socket module code reset switching, and a function button for power consumption display.

* * * * *